United States Patent
Fourie et al.

(10) Patent No.: US 12,504,444 B2
(45) Date of Patent: Dec. 23, 2025

(54) SHORT CIRCUIT TESTER FOR HIGH POWER DC CIRCUITS

(71) Applicant: Nvidia Corporation, Santa Clara, CA (US)

(72) Inventors: Frans Johannes Fourie, Portland, OR (US); Ryan Kelsey Albright, Beaverton, OR (US); Akhilesh Sandeep Thakur, Portland, OR (US); Kevin Matthew Hoser, Portland, OR (US); Grant Michael Skidmore, Portland, OR (US); Zachary Jacob Watkins, Hillsboro, OR (US); Audrey Grace Cummings, Hillsboro, OR (US); Jose Eduardo Barcenas, Portland, OR (US); Jorian Matias Bruslind, Beaverton, OR (US); Daniel Garanton, Hillsboro, OR (US)

(73) Assignee: Nvidia Corporation, Santa Clara, CA (US)

( * ) Notice: Subject to any disclaimer, the term of this patent is extended or adjusted under 35 U.S.C. 154(b) by 274 days.

(21) Appl. No.: 18/144,682

(22) Filed: May 8, 2023

(65) Prior Publication Data

US 2024/0377438 A1 Nov. 14, 2024

(51) Int. Cl.
*G01R 1/20* (2006.01)
*G01R 31/52* (2020.01)

(52) U.S. Cl.
CPC ............... *G01R 1/20* (2013.01); *G01R 31/52* (2020.01)

(58) Field of Classification Search
CPC .......... G01R 1/20; G01R 31/52; G01R 31/50; G01R 31/385; G01R 31/2829; G01R 31/20; G01R 31/006
USPC .............................. 218/2, 8, 55, 79, 80, 100
See application file for complete search history.

(56) References Cited

U.S. PATENT DOCUMENTS

| | | | |
|---|---|---|---|
| 6,265,885 B1 * | 7/2001 | Luo ..................... | G01R 31/2829 324/719 |
| 7,208,955 B2 * | 4/2007 | Zansky ............... | G01R 31/3277 324/418 |
| 7,402,992 B2 * | 7/2008 | Locke .................. | G01R 31/263 324/133 |
| 9,046,564 B1 * | 6/2015 | Griffin ................. | G01R 31/006 |
| 11,255,883 B2 * | 2/2022 | Kim .................. | H01M 8/04649 |
| 11,474,162 B2 * | 10/2022 | Magno .................... | G01R 19/15 |
| 2021/0172999 A1 * | 6/2021 | Nam .................... | G01R 31/3181 |

\* cited by examiner

*Primary Examiner* — William A Bolton
(74) *Attorney, Agent, or Firm* — Hogan Lovells US LLP

(57) ABSTRACT

Approaches presented herein provide for a short circuit testing fixture in which a switch arm is associated with a switch bridge and with a trigger mechanism to enable testing of electrical shorts in high powered DC circuits. The trigger mechanism causes the switch arm to contact the switch bridge and close an energized circuit to cause a short. The switch arm maintains the closed energized circuit after the short until the circuit is deenergized.

20 Claims, 7 Drawing Sheets

SHORT CIRCUIT TESTER FOR HIGH POWER DC CIRCUITS

TECHNICAL FIELD

At least one embodiment pertains to testing fixtures used to perform short circuit testing. For example, at least one embodiment pertains to a testing fixture including a switch arm associated with a switch bridge and a trigger mechanism to enable testing of electrical shorts in high powered direct current (DC) circuits.

BACKGROUND

Various types of electrical testing are often required for electronics under specific, reproducible conditions. A short in a circuit can occur unintentionally during real world use and therefore may need to be recreated during testing. However, a short occurring in a high power DC circuit can be volatile, can create specific electrical conditions, and can be maintained for an extended period of time until the circuit saves itself or fails. Accordingly, recreating a short in a circuit for testing purposes can be difficult to perform accurately, consistently, and safely. A relatively small DC testing fixture able to repeatably close and maintain energized DC circuits is not available. Power providers, factories, and large scale entities that commonly manage shorted high power DC circuits, may utilize alternative mechanisms such as massive DC switches, oil bathing switches, or using other specialized devices. These solutions are not practical for small applications, portable, or easily interchangeable with different circuits.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1A:
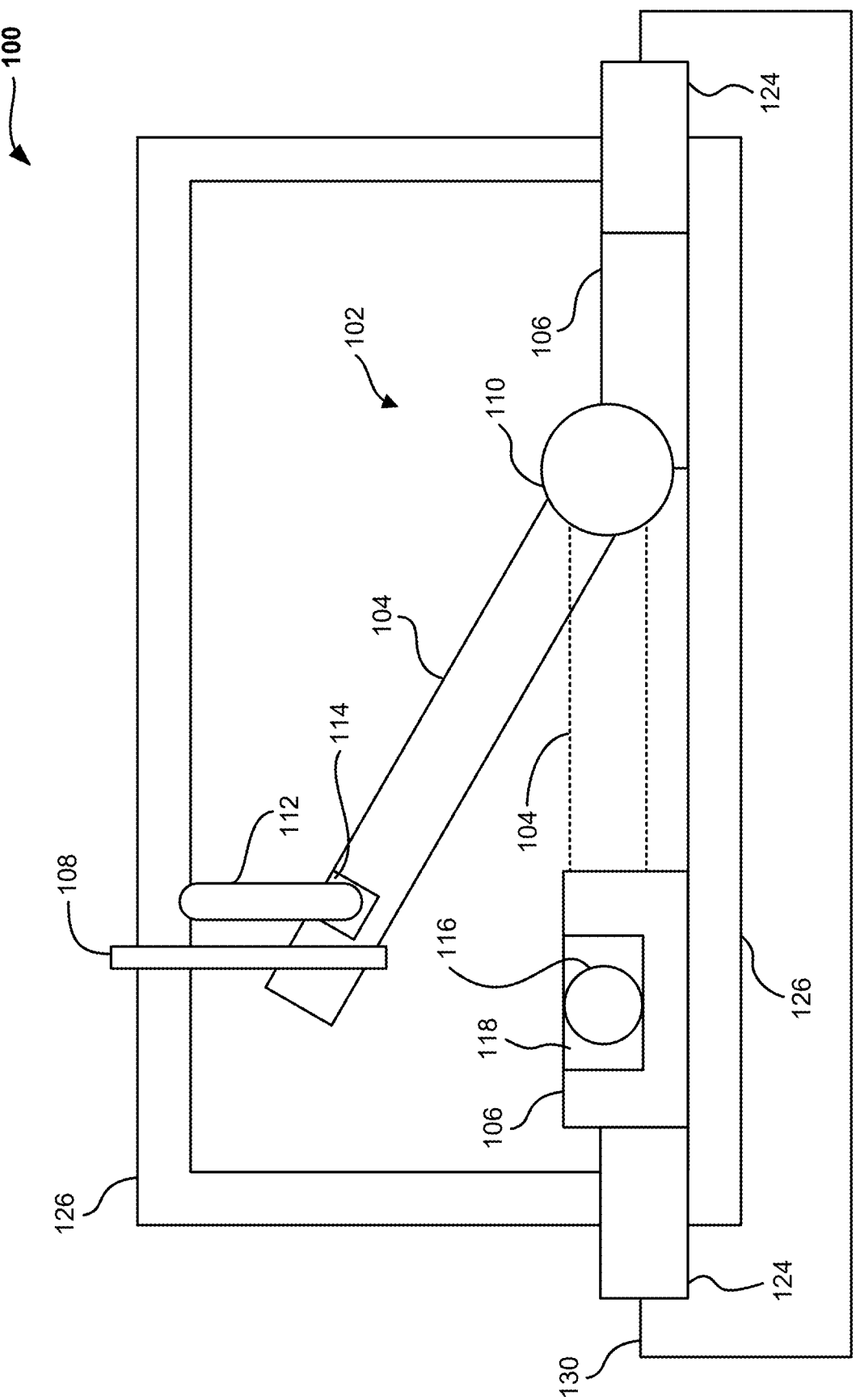
FIG. 1A illustrates a side view of a system associated with a short circuit testing fixture, according to at least one embodiment.
Figure 1B:
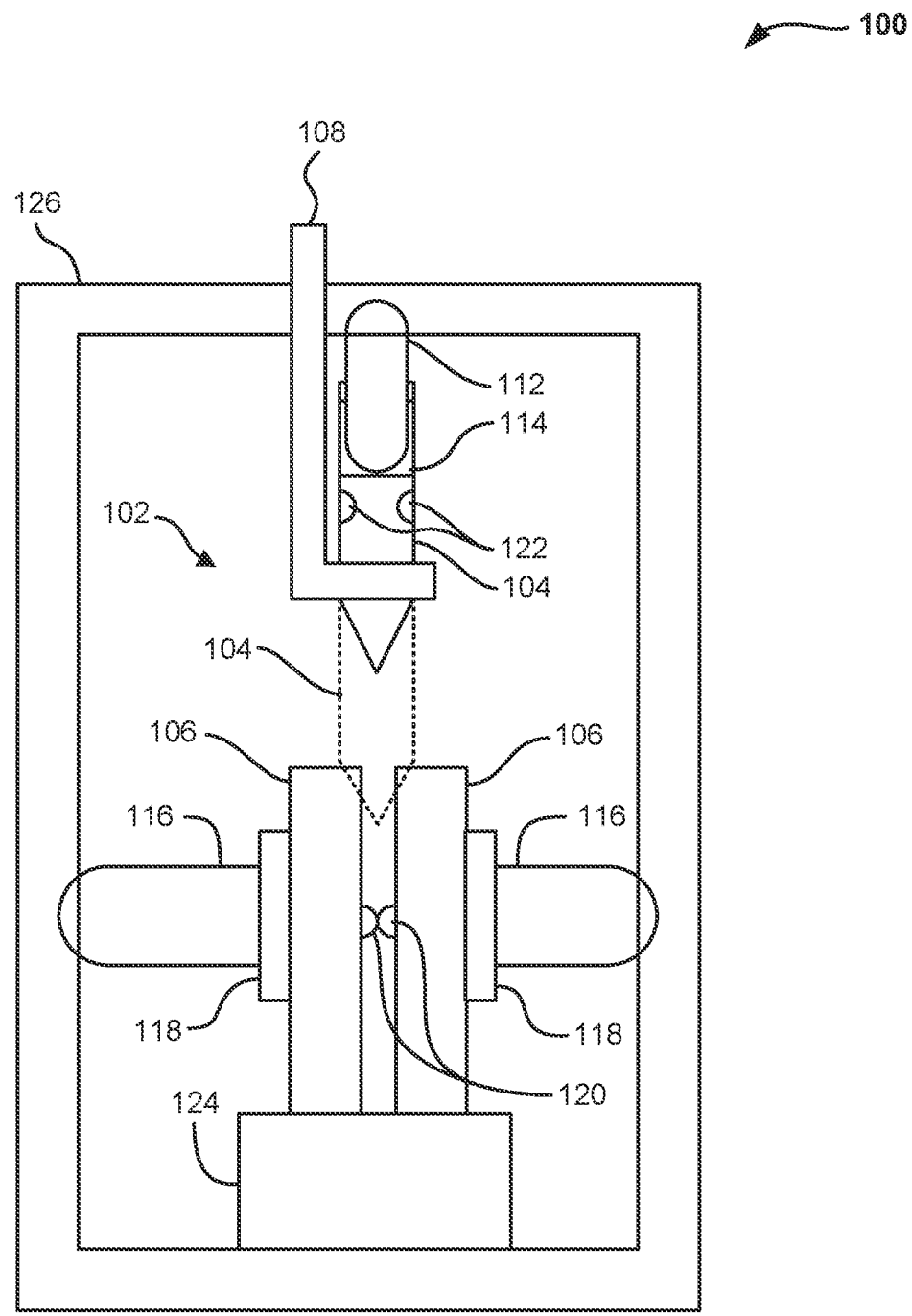
FIG. 1B illustrates a front view of the system associated with the short circuit testing fixture, according to at least one embodiment.

FIGS. 1A and 1B illustrate an example system associated with a short circuit testing fixture according to at least one embodiment. FIG. 1A illustrates a side view of an example system associated with short circuit testing fixture 100 in accordance with at least one embodiment. Testing fixture 100 includes electrical switch 102 that may be able to, when in a closed position, close a high power DC circuit 130 to induce a short. In at least one embodiment, switch 102 may remain closed until the electrical load is removed from the circuit 130. Switch 102 of testing fixture 100 may include switch arm 104 that may be moved from an open position to a closed position (dashed outline). Switch 102 may only need to be closed to enable testing of circuits experiencing a short and switch 102 may not need to be reopened until after an electrical load is removed. In one or more embodiments, a test requires an electronic device to either save itself or fail, and therefore switch 102 does not need to be opened while a circuit 130 is loaded. After a test is completed and an electronic device has been saved or fails, the circuit 130 will be deenergized in at least one embodiment. A deenergized switch 102 can be opened safely and switch 102 may not need to be opened for a test while electrically loaded. In some embodiments, testing fixture 100 may be able to handle high power DC current, up to at least 22 kilowatts, passing through testing fixture 100 for an extended time. In certain embodiments testing fixture 100 may maintain a high power DC current for over ten minutes. In at least one embodiment, testing fixture 100 only needs to close circuits to complete a test, and testing fixture 100 may be opened only after an electrical load is removed from a circuit 130. Additionally, testing fixture 100 may be reusable any number of times, by resetting testing fixture 100 and returning switch 102 to an open position.

In at least one embodiment, switch 102 of testing fixture 100 may include switch arm 104, including one or more copper plates or other conductive members, and switch bridge 106, including one or more copper plates or other conductive members. Switch arm 104 is able to move into contact with switch bridge 106 and complete a circuit 130 when switch arm 104 is activated by trigger mechanism 108. Switch bridge 106 is able to connect with a circuit 130 to be closed by switch arm 104. In certain embodiments, switch bridge 106 connects to two open ends of a circuit 130 to be tested, where closing switch arm 104 closes a circuit 130. In at least one embodiment, switch bridge 106 includes conductive plates that are connected by switch arm 104 when in a closed position. In some embodiments, switch arm 104 may be fixedly or rotatably connected to a first conductive plate of switch bridge 106, such as by hinge 110, and releasably connected to a second conductive plate of switch bridge 106. Hinge 110 may be constructed at least in part from copper or other conductive materials and may aid in achieving consistent and accurate test results.

In certain embodiments, switch arm 104 may be driven by switch arm driver 112, such as a spring, compression body, solenoid, gas piston, heavy mass, or any other suitable driving device, to at least assist positioning switch arm 104 in contact with switch bridge 106. Switch arm driver 112 may apply a force that is sufficient to place switch arm 104 into a closed position. A conductive plate of switch arm 104 may include arm isolation plate 114 between switch arm driver 112 and a conductive plate of switch arm 104. Arm isolation plate 114 provides insulation between switch arm driver 112 and a conductive plate of switch arm 104 to prevent a DC current from switch arm 104 to pass to switch arm driver 112, such as in cases of an arc. In at least one embodiment, arm isolation plate 114 may be constructed from an insulating plastic or any other suitable insulating material.

Switch arm 104 may be activated and placed into a closed position when switch arm driver 112 is released or triggered by trigger mechanism 108. Trigger mechanism 108 may include a latch to secure or retain switch arm 104. In at least one embodiment, trigger mechanism 108 may be constructed at least in part from insulating plastic or any other suitable insulating material. In certain embodiments, switch arm 104 is dropped or released from a location above switch bridge 106, and gravity may be used to assist in lowering switch arm 104 into contact with switch bridge 106. In some embodiments switch arm 104 slides into place next to or between sections of switch bridge 106. For example, switch arm 104 may be released and slide into position between two conductive plates of switch bridge 106. After switch arm driver 112 is triggered and releases switch arm 104, switch arm driver 112 may require a manual reset and be latched into place to retain switch arm 104 in an open position. When opening an energized high power DC circuit 130, an arc may occur and weld the circuit 130 shut. In at least one embodiment, switch 102 may be prevented from opening while a circuit 130 is energized during a test.

Switch arm 104 and switch bridge 106 may be constructed at least in part from any suitable conductive material to cause a short in a circuit 130, and to reduce or remove unwanted effects on tests and related measurements. In some embodiments, switch arm 104 and switch bridge 106 may be made at least in part from copper. In certain embodiments, switch arm 104 is positioned above switch bridge 106 in an open position and is sufficiently heavy to allow gravity to at least assist in positioning switch arm 104 next to switch bridge 106 in a closed position, as well as reduce mechanical bounce. In order to ensure consistent and accurate test results, switch arm 104 of testing fixture 100 may have no registerable or almost no registerable mechanical bounce when entering a closed position to complete a circuit 130, and therefore create and maintain a short immediately. When switch arm 104 moves into place to complete a circuit 130, in order to reduce any effect on test results, mechanical bounce of switch arm 104 entering into position may be minimized or removed. In some embodiments switch arm 104 may move into closed position vertically, horizontally, or laterally.

In certain instances, one or more switch bridge bias applicators 116, such as a spring, compression body, or any other suitable device, may be applied to switch bridge 106 in order to apply a force toward switch arm 104 while in a closed position. A force created by one or more bias applicators 116 may cause one or more conductive plates of switch bridge 106 to apply pressure or clamp down on switch arm 104. An inward force on switch arm 104 by bias applicators 116 may reduce or remove mechanical bounce. Reducing or removing mechanical bounce may prevent a connection formed between switch arm 104 and switch bridge 106, completing a circuit 130, from immediately disconnecting if switch arm 104 would be moved out of a closed position. In at least one embodiment, switch bridge bias applicator 116 does not apply too great of a force to prevent switch arm 104 from moving into a closed position with switch bridge 106.

In certain embodiments, switch arm 104 in a closed position may be positioned between two conductive plates of switch bridge 106 which are pushed inwardly by two opposing bias applicators 116, clamping switch arm 104 and minimizing mechanical bounce of switch arm 104. One or more conductive plates of switch bridge 106 may each include a bridge isolation plate 118 between biasing applicator 116 and a conductive plate of switch bridge 106. Bridge solation plate 118 provides insulation between biasing applicator 116 and a conductive plate to prevent current from a closed circuit 130 to pass from switch bridge 106 to bias applicator 116. In at least one embodiment, bridge isolation plate 118 may be constructed from insulating plastic or another suitable insulating material.

FIG. 1B illustrates a front view of an example system associated with short circuit testing fixture 100, such as for the circuit 130 as described related to FIG. 1A. In one or more embodiments, switch bridge 106 may include one or more switch bridge elements 120 able to interact with switch arm 104 and secure switch arm 104 in a closed position. In some embodiments, switch arm 104 may include one or more switch arm elements 122 to interact with switch bridge 106 and secure switch arm 104 to in a closed position. In certain embodiments one or more switch bridge elements 120 may interact with one or more switch arm elements 122 to secure switch arm 104 in a closed position. Switch bridge elements 120 and switch arm elements 122 may reduce mechanical bounce of switch arm 104 and may assist in preventing switch arm 104 from moving from a closed position to an open position. In one embodiment, switch bridge element 120 may be a knob and switch arm element 122 may be an indent, where a knob and an indent are shaped for an indent to receive a knob. In another embodiment, switch bridge element 120 may be an indent and switch arm element 122 may be a knob. Switch bridge element 120 and switch arm element 122 may be any suitable securing device or retaining system. In at least one embodiment, indents located on opposite faces of switch arm 104 are formed to accept knobs located on opposing faces of switch bridge 106 when switch arm 104 enters a closed position, at least assisting in retaining switch arm 104.

In some embodiments, testing fixture 100 may include one or more wire connection blocks 124. Wire connection blocks 124 may connect to switch 102 and connect to electronics to be tested, completing a circuit including the electronic connected to wire connections blocks 124 when switch 102 is closed. In at least one example, testing fixture 100 may include two wire connection blocks 124 to connect to each end of an open circuit of an electronic device to be tested.

In order to accurately and repeatably test electronic boards and other equipment, testing fixture 100 may include wire connection blocks 124 each accommodate circuits with low gauge wire connectors, such as 0 AWG wire, 1 AWG wire, or any other suitable wire to support accurate testing. Connecting testing fixture 100 with an electronic to be tested using a low gauge wire connector allows for testing fixture 100 to recreate real world conditions by minimizing or removing unwanted effects on a circuit. Connecting testing fixture 100 with an electronic to be tested using a high gauge wire connector may introduce unwanted high levels of inductance, capacitance, and resistance into the circuit. Short circuit testing attempts to simulate the real world conditions. The real world conditions may include locally dropping a screwdriver, jewelry, or other small conductive items onto electronics and creating a short circuit. To recreate the low inductance, capacitance, and resistance levels of real world examples, the inductance, capacitance, and resistance in a circuit during testing should be low, which using the low gauge wire connectors with testing fixture 100 enable. In certain embodiments, wire connection blocks 124 include a section of low gauge wire or other suitable conductive material able to connect to a circuit.

While a large gauge wire may be impractical for testing purposes in some instances, short circuit testing requires testing fixture 100 to maintain high loads while a circuit is closed. Wire connection blocks 124 of testing fixture 100 may incorporate sections of a low gauge wire or other suitable conductive material to connect to a circuit. Additionally, in order to simulate the real world conditions for testing, a short circuit path impedance should be constant, near constant, and/or approximately constant. In at least one embodiment, testing fixture 100 may ensure the short circuit path impedance is constant when switch 102 enters a closed position and maintains a closed circuit.

Testing of high power products under a load can become hazardous and therefore the safety of users should be protected during use of testing fixture 100. When inducing a short in a circuit, a risk exists of arc flashes occurring, electrocution of the testing fixture operators by a high power current, and other dangerous conditions. In certain embodiments, testing fixture 100 may be operated at a safe distance from an operator. Testing fixture 100 may include a switch 102 that can be closed remotely. In some embodiments, switch 102 may be closed remotely using trigger mechanism 108 controlled electronically, mechanically, both, or any other suitable method. By operating testing fixture 100 from a distance, safety devices can be used between testing fixture 100 and an operator, such as an arc shield, and an operator may be located outside an area or room where the circuit testing occurs.

Any suitable trigger mechanism 108 may be used with testing fixture 100 to trigger switch 102 to close a circuit for testing. In some embodiments, trigger mechanism 108 may be low cost and use few parts, such as a mechanical design. Trigger mechanism 108 may include a string, wire, thread, latch, cross barriers, or similar article to manually pull and release switch 102 from behind an arc shield or other barrier. In some embodiments, an electronic trigger mechanism, such as a solenoid, electrically controlled latch, electromagnet, or similar article, may be used to trigger switch arm 104 into a closed position. In at least one embodiment, an electromagnet trigger mechanism may be used to keep switch 102 open and then close switch 102. In certain embodiments, an electronic trigger mechanism may be operated from a room or enclosure separate from the testing area. In yet another embodiment, trigger mechanism 108 may be a mechanical trigger coupled with an electronic remote controller. In certain embodiments, an electronic trigger mechanism includes microcontrollers allowing for logic, such as providing microcontrollers an input signal that is used to trigger switch 102 on, trigger switch 102 after a time delay, or remotely trigger switch 102 by an operator.

In certain embodiments, testing fixture may include a smart trigger mechanism. During testing, a smart trigger mechanism may be able to collect any number of measurements and data related to trigger mechanism 108 and testing fixture 100. In one embodiment, a smart trigger mechanism may be able to measure exactly when switch 102 is triggered and may be able to measure exactly when switch 102 is closed. A smart trigger mechanism may be able to monitor any mechanical bounce of switch arm 104. Additionally, a smart trigger mechanism may be able to measure if a circuit opened after switch arm 104 was in a closed position and the circuit had closed. A smart trigger mechanism may be able to measure power going through switch 102. In one example, a smart trigger mechanism may be able to measure power going through a shorted circuit and determine the length of time a circuit was energized before the circuit either saved itself and turned off or the circuit failed. A smart trigger mechanism may include or be attached to any number or type of sensors to collect measurements and data.

Testing fixture 100 may also include a housing 126 that may contain electrical hazards related to initiating a short. In some embodiments, housing 126 may enclose or partially enclose part or all of switch 102, and housing 126 may at least enclose or partially enclose part or all of any other features of testing fixture 100. Housing 126 may be able to reduce one or more danger hazards created by effects of the short circuit testing by enclosing or partially enclosing switch 102 when creating a short in a circuit. In some embodiments, housing 126 is made at least partially from an insulating material, and may be made at least partially from plastic. Housing 126 may be at least partially formed from insulating plastic to assist in maintaining dangerous hazards inside housing 126.

Switch 102 may be reset after an energized circuit has been closed and the current has then been removed from the circuit. Switch 102 may be reset by opening the circuit and retaining switch arm 104 in an open position. In some embodiment, switch 102 is reset manually, automatically, and/or remotely. In some embodiment, resetting switch 102 after the circuit is deenergized may include pulling switch arm 104 from a closed circuit position to an open circuit position. Then, as switch arm 104 is positioned in the open circuit position, switch arm driver 112 may be reset, such as compressing a spring, and switch arm 104 is secured back into an open position using a latching mechanism. When initiating another test, the latching mechanism is released by trigger mechanism 108 and switch arm driver 112 pushes switch arm 104 into a closed circuit position. In one embodiment, an electromagnet may be used as latching mechanism 108 and/or switch arm driver 112, and the electromagnet may secure and push switch arm 104 into a closed position.

In certain embodiments, testing fixture 100 may also have dimensions and weight conducive to portability, which may include being carried by an operator or moved from one room to another. Testing fixture 100 may have relatively small dimensions and weight to allow for transporting by hand or on a hand pushed cart. In at least one embodiment, the size of testing fixture 100 allows for placement near electrical equipment or a circuit to be connected and tested without requiring cables of a length that will negatively impact testing results. In one embodiment, testing fixture 100 may be placed immediately next to a circuit to be tested. The dimensions of testing fixture 100 may be approximately one foot long, one foot wide, and one foot high, however testing fixture 100 may be significantly smaller or larger in one or more dimensions. Testing fixture 100 may weigh approximately ten pounds, however testing fixture 100 may be significantly lighter or heavier. In at least one embodiment testing fixture 100 may be relatively low cost and may be constructed of low-cost materials, minimal amount of parts, and/or incorporate a basic design. In some embodiments, testing fixture 100 may be used to test any number of different electronics.

Testing fixture 100 may also be a measurement fixture that measures and collects data. Any relevant testing and measuring elements may be incorporated into testing fixture 100 and testing fixture 100 may include any number of sensors or other suitable collection and measuring devices. In some embodiments any number and type of sensors could be incorporated into trigger mechanism 108. Sensors for electrical testing may be located in or on any number of areas of trigger mechanism 108, to measure characteristics of interest including forces, electrical load, timing of a short, or any other characteristic. In some embodiments, any number and type of sensors could be incorporated into switch 102. Sensors for electrical testing may be located in or on any number of areas of switch 102, to measure characteristics of interest including forces, positions of switch arm 104, activation of trigger mechanism 108, or any other characteristic.

In at least one embodiment, any number of features of testing fixture 100 may be associated with a system, such as a computer and/or processer. The features may include sensors, data collectors, controllers, motors, actuators, automation systems, and any other suitable devices. The features may be related to any aspect of testing fixture 100 and may be located on, near, and/or be in communication with testing fixture 100. In some instances, one or more features may be removable, interchangeable, and/or may be disabled.

Figure 2:
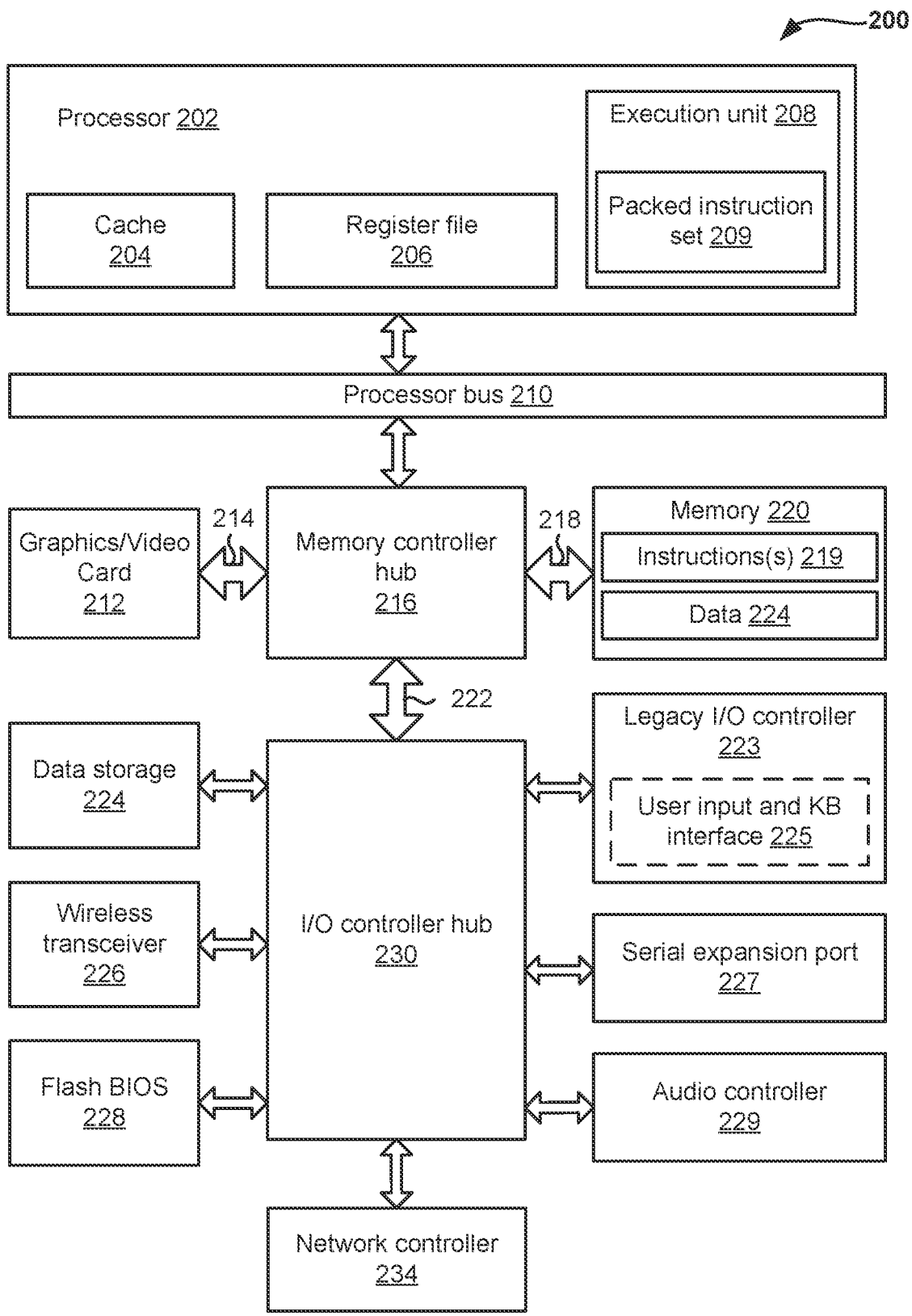
FIG. 2 illustrates computer and processor aspects of a system associated with a testing fixture, according to at least one embodiment.

FIG. 2 illustrates computer and processor aspects 200 of a system associated with a testing fixture. The computer and processor aspects may be performed by one or more processors that include a system-on-a-chip (SOC) or some combination thereof formed with a processor that may include execution units to execute an instruction, according to at least one embodiment.

In at least one embodiment, the computer and processor aspects 200 may include, without limitation, a component, such as a processor 202 to employ execution units including logic to perform algorithms for process data, in accordance with present disclosure, such as in embodiment described herein. In at least one embodiment, the computer and processor aspects 200 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, the computer and processor aspects 200 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, the computer and processor aspects 200 may include, without limitation, a processor 202 that may include, without limitation, one or more execution units 208 to perform aspects according to techniques described with respect to at least one or more of FIGS. 1A-1B, and 3-4 herein. In at least one embodiment, the computer and processor aspects 200 is a single processor desktop or server system, but in another embodiment, the computer and processor aspects 200 may be a multiprocessor system.

In at least one embodiment, the processor 202 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, a processor 202 may be coupled to a processor bus 210 that may transmit data signals between processor 202 and other components in computer system 200.

In at least one embodiment, a processor 202 may include, without limitation, a Level 1 ("L1") internal cache memory ("cache") 204. In at least one embodiment, a processor 202 may have a single internal cache or multiple levels of internal cache. In at least one embodiment, cache memory may reside external to a processor 202. Other embodiments may also include a combination of both internal and external caches depending on particular implementation and needs. In at least one embodiment, a register file 206 may store different types of data in various registers including, without limitation, integer registers, floating point registers, status registers, and an instruction pointer register.

In at least one embodiment, an execution unit 208, including, without limitation, logic to perform integer and floating point operations, also resides in a processor 202. In at least one embodiment, a processor 202 may also include a microcode ("ucode") read only memory ("ROM") that stores microcode for certain macro instructions. In at least one embodiment, an execution unit 208 may include logic to handle a packed instruction set 209.

In at least one embodiment, by including a packed instruction set 209 in an instruction set of a general-purpose processor, along with associated circuitry to execute instructions, operations used by many multimedia applications may be performed using packed data in a processor 202. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, an execution unit 208 may also be used in microcontrollers, embedded processors, graphics devices, DSPs, and other types of logic circuits.

In at least one embodiment, the computer and processor aspects 200 may include, without limitation, a memory 220. In at least one embodiment, a memory 220 may be a Dynamic Random Access Memory ("DRAM") device, a Static Random Access Memory ("SRAM") device, a flash memory device, or another memory device. In at least one embodiment, a memory 220 may store instruction(s) 219 and/or data 221 represented by data signals that may be executed by a processor 202.

In at least one embodiment, a system logic chip may be coupled to a processor bus 210 and a memory 220. In at least one embodiment, a system logic chip may include, without limitation, a memory controller hub ("MCH") 216, and processor 202 may communicate with MCH 216 via processor bus 210. In at least one embodiment, an MCH 216 may provide a high bandwidth memory path 218 to a memory 220 for instruction and data storage and for storage of graphics commands, data and textures. In at least one embodiment, an MCH 216 may direct data signals between a processor 202, a memory 220, and other components in the computer and processor aspects 200 and to bridge data signals between a processor bus 210, a memory 220, and a system I/O interface 222. In at least one embodiment, a system logic chip may provide a graphics port for coupling to a graphics controller. In at least one embodiment, an MCH 216 may be coupled to a memory 220 through a high bandwidth memory path 218 and a graphics/video card 212 may be coupled to an MCH 216 through an Accelerated Graphics Port ("AGP") interconnect 214.

In at least one embodiment, the computer and processor aspects 200 may use a system I/O interface 222 as a proprietary hub interface bus to couple an MCH 216 to an I/O controller hub ("ICH") 230. In at least one embodiment, an ICH 230 may provide direct connections to some I/O devices via a local I/O bus. In at least one embodiment, a local I/O bus may include, without limitation, a high-speed I/O bus for connecting peripherals to a memory 220, a chipset, and processor 202. Examples may include, without limitation, an audio controller 229, a firmware hub ("flash BIOS") 228, a wireless transceiver 226, a data storage 224, a legacy I/O controller 223 containing user input and keyboard interfaces 225, a serial expansion port 227, such as a Universal Serial Bus ("USB") port, and a network controller 234. In at least one embodiment, data storage 224 may comprise a hard disk drive, a floppy disk drive, a CD-ROM device, a flash memory device, or other mass storage device.

In at least one embodiment, FIG. 2 illustrates computer and processor aspects 200, which includes interconnected hardware devices or "chips", whereas in other embodiments, FIG. 2 may illustrate an exemplary SoC. In at least one embodiment, devices illustrated in FIG. 2 may be interconnected with proprietary interconnects, standardized interconnects (e.g., PCIe) or some combination thereof. In at least one embodiment, one or more components of the computer and processor aspects 200 that are interconnected using compute express link (CXL) interconnects.

In at least one embodiment, the computer and processor aspects 200 having one or more processing units may be used in a system to communicate signals with testing fixture 100. This enables testing of a circuit by testing fixture 100. Further, sensing, data collection, control, powering, actuating, and automating related to testing fixture 100 may be enabled by the computer and processor aspects 200.

Figure 3:
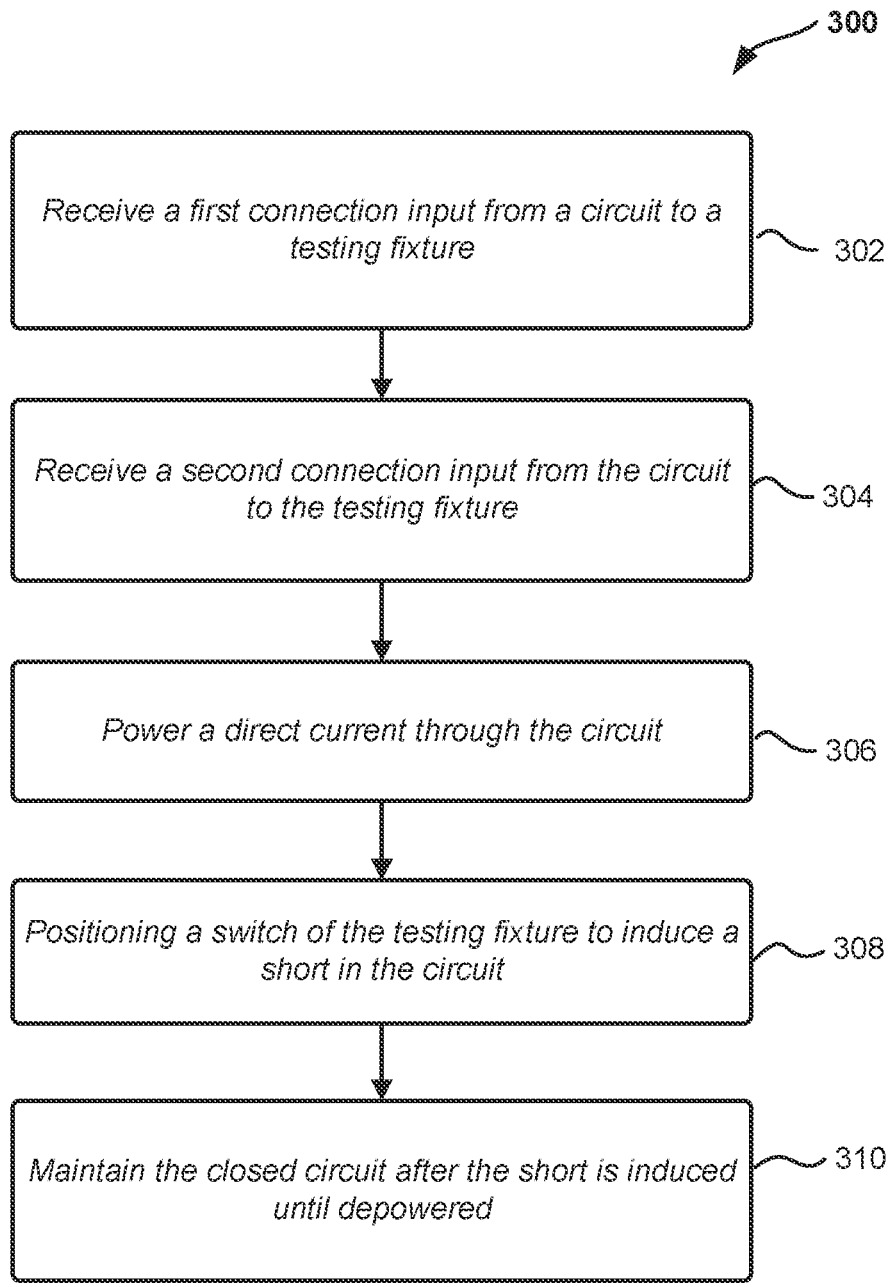
FIG. 3 illustrates an example process for inducing a short in a circuit using a testing fixture, according to at least one embodiment.

FIG. 3 illustrates an example process or method 300 for inducing a short in a circuit using a testing fixture, according to at least one embodiment. The method 300 includes receiving (302) a first connection input from a circuit to a testing fixture in order to induce a short in the high power direct current circuit. The method 300 includes receiving (304) a second connection input from the circuit to the testing fixture. The method 300 includes powering (306) a direct current through the circuit. The method 300 includes positioning (308) a switch of the testing fixture to electrically connect the first input and the second input, the switch closing the circuit and inducing the short. The method 300 includes maintaining (310) the closed circuit after the short is induced until depowered.

In at least one embodiment, the method 300 may include a step or a sub-step for measuring one or more characteristics of the circuit. In at least one embodiment, the method 300 may include a step or a sub-step for measuring one or more characteristics of the switch.

Figure 4:
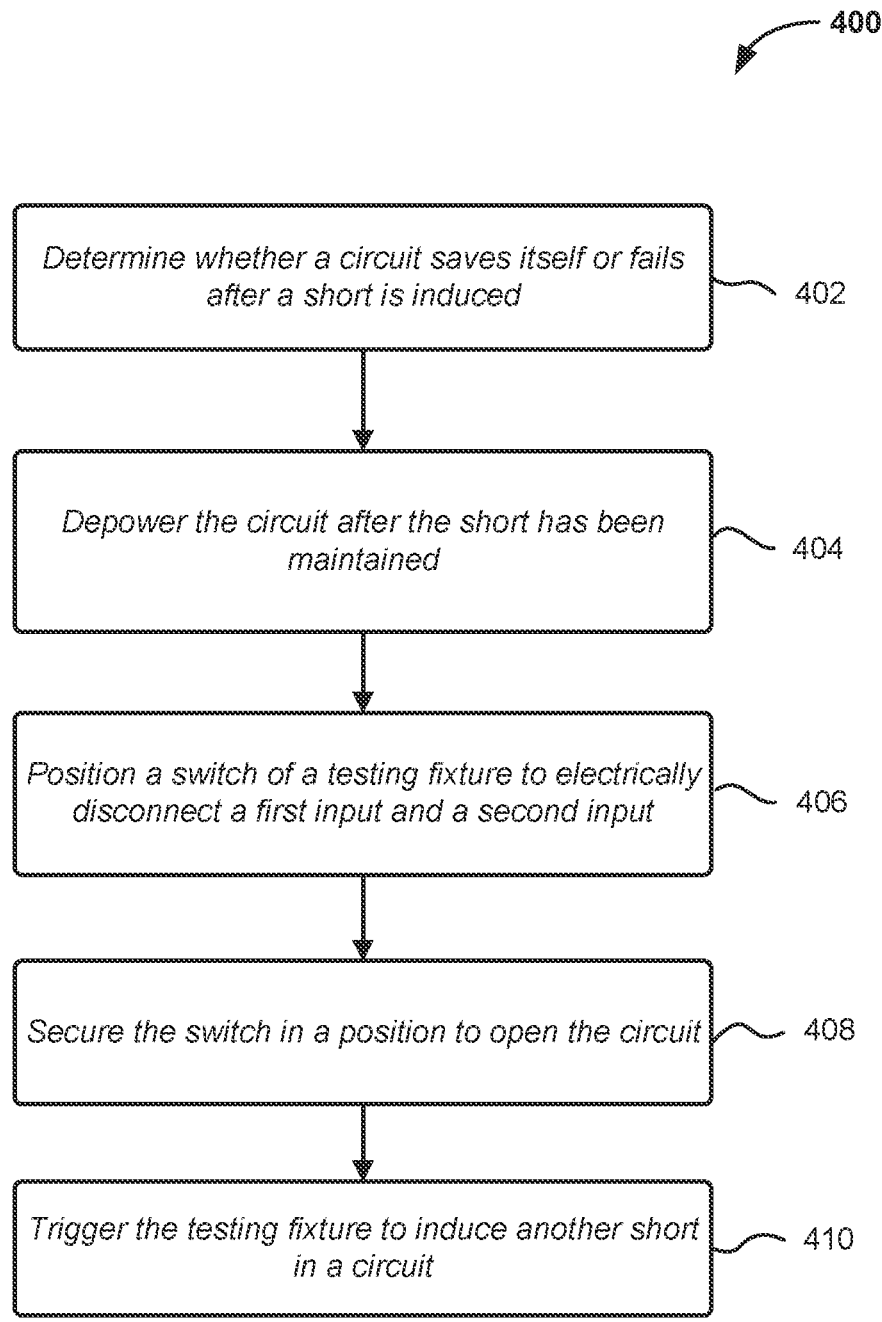
FIG. 4 illustrates an example process for resetting a testing fixture after inducing a short in a circuit, according to at least one embodiment.

FIG. 4 illustrates an example process or method 400 for resetting a testing fixture after inducing a short in a circuit, according to at least one embodiment. The method 400 includes determining (402) whether a circuit saves itself or fails after inducing a short in the circuit with the testing fixture. The method 400 includes depowering (404) the closed circuit after the short has been maintained. The method 400 includes positioning (406) a switch of a testing fixture to electrically disconnect a first input and a second input. The method 400 includes securing (408) the switch in a position to open the circuit. The method 400 includes triggering (410) the testing fixture to induce another short in a circuit. This step (410) may be in support of step 308 in FIG. 3. Such a process can be used to reset a test feature after inducing a short in a circuit in any of a number of devices including electronic circuitry. These may include, without limitation, computers, processors, motherboards, graphics cards, network interface cards (NICs), network switches, network routers, load balancers, and other such devices.

Data Center

Figure 5:
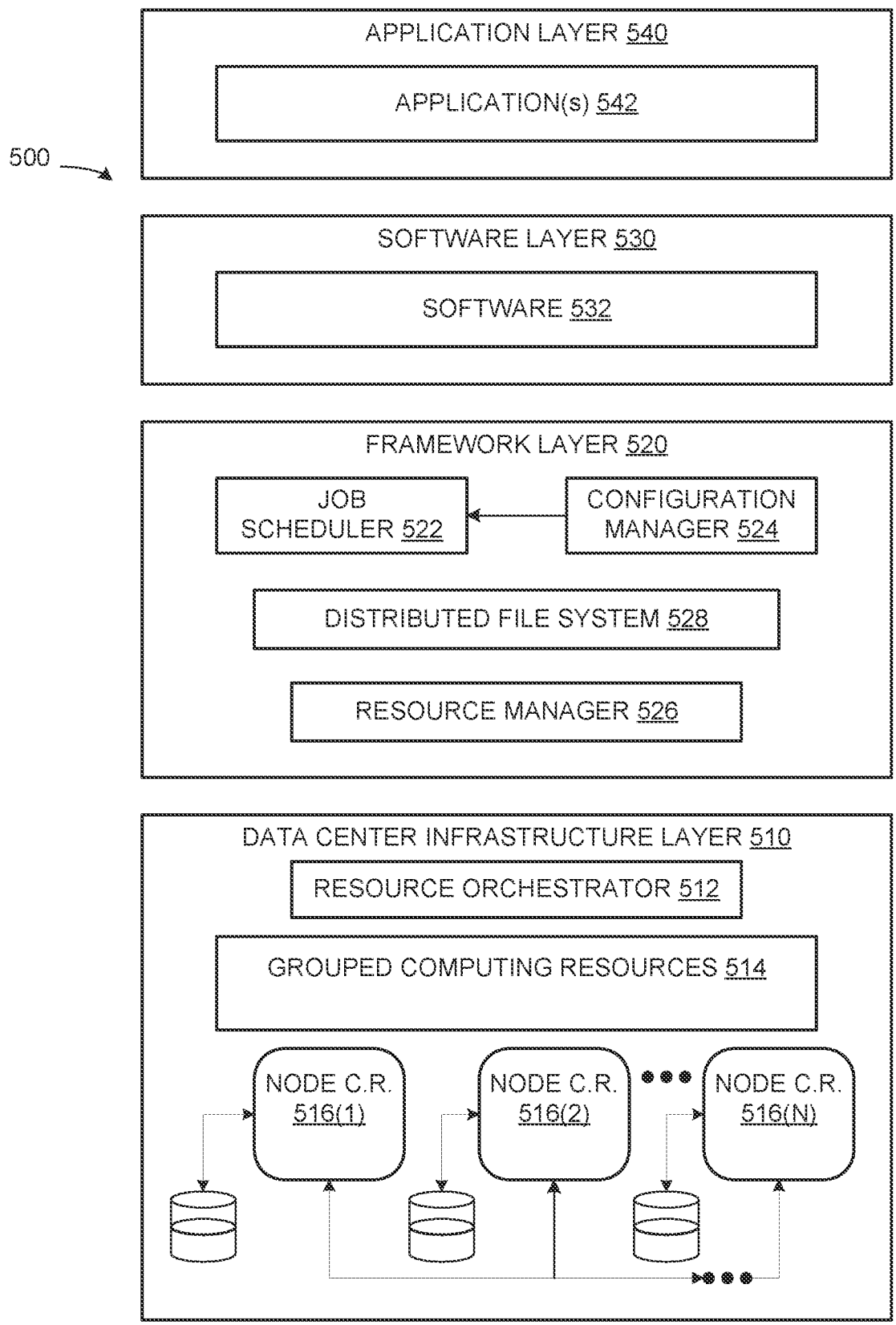
FIG. 5 illustrates an example data center system, according to at least one embodiment.

FIG. 5 illustrates an example data center 500, in which at least one embodiment may be used. For example, a computing device might be placed in such a data center, and it may be desirable to test a circuit located in such an environment. In at least one embodiment, data center 500 includes a data center infrastructure layer 510, a framework layer 520, a software layer 530, and an application layer 540.

In at least one embodiment, as shown in FIG. 5, data center infrastructure layer 510 may include a resource orchestrator 512, grouped computing resources 514, and node computing resources ("node C.R.s") 516(1)-516(N), where "N" represents any whole, positive integer. In at least one embodiment, node C.R.s 516(1)-516(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 516(1)-516(N) may be a server having one or more of above-mentioned computing resources.

In at least one embodiment, grouped computing resources 514 may include separate groupings of node C.R.s housed within one or more racks (not shown), or many racks housed in data centers at various geographical locations (also not shown). Separate groupings of node C.R.s within grouped computing resources 514 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 512 may configure or otherwise control one or more node C.R.s 516(1)-516(N) and/or grouped computing resources 514. In at least one embodiment, resource orchestrator 512 may include a software design infrastructure ("SDI") management entity for data center 500. In at least one embodiment, resource orchestrator may include hardware, software or some combination thereof.

In at least one embodiment, as shown in FIG. 5, framework layer 520 includes a job scheduler 522, a configuration manager 524, a resource manager 526 and a distributed file system 528. In at least one embodiment, framework layer 520 may include a framework to support software 532 of software layer 530 and/or one or more application(s) 542 of application layer 540. In at least one embodiment, software 532 or application(s) 542 may respectively include web-based service software or applications, such as those provided by Amazon Web Services, Google Cloud and Microsoft Azure. In at least one embodiment, framework layer 520 may be, but is not limited to, a type of free and open-source software web application framework such as Apache Spark™M (hereinafter "Spark") that may use distributed file system 528 for large-scale data processing (e.g., "big data"). In at least one embodiment, job scheduler 522 may include a Spark driver to facilitate scheduling of workloads supported by various layers of data center 500. In at least one embodiment, configuration manager 524 may be capable of configuring different layers such as software layer 530 and framework layer 520 including Spark and distributed file system 528 for supporting large-scale data processing. In at least one embodiment, resource manager 526 may be capable of managing clustered or grouped computing resources mapped to or allocated for support of distributed file system 528 and job scheduler 522. In at least one embodiment, clustered or grouped computing resources may include grouped computing resource 514 at data center infrastructure layer 510. In at least one embodiment, resource manager 526 may coordinate with resource orchestrator 512 to manage these mapped or allocated computing resources.

In at least one embodiment, software 532 included in software layer 530 may include software used by at least portions of node C.R.s 516(1)-516(N), grouped computing resources 514, and/or distributed file system 528 of framework layer 520. The one or more types of software may include, but are not limited to, Internet web page search software, e-mail virus scan software, database software, and streaming video content software.

In at least one embodiment, application(s) 542 included in application layer 540 may include one or more types of applications used by at least portions of node C.R.s 516(1)-516(N), grouped computing resources 514, and/or distributed file system 528 of framework layer 520. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 524, resource manager 526, and resource orchestrator 512 may implement any number and type of self-modifying actions based on any amount and type of data acquired in any technically feasible fashion. In at least one embodiment, self-modifying actions may relieve a data center operator of data center 500 from making possibly bad configuration decisions and possibly avoiding underused and/or poor performing portions of a data center.

In at least one embodiment, data center 500 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 500. In at least one embodiment, trained machine learning models corresponding to one or more neural networks may be used to infer or predict information using resources described above with respect to data center 500 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Figure 6:
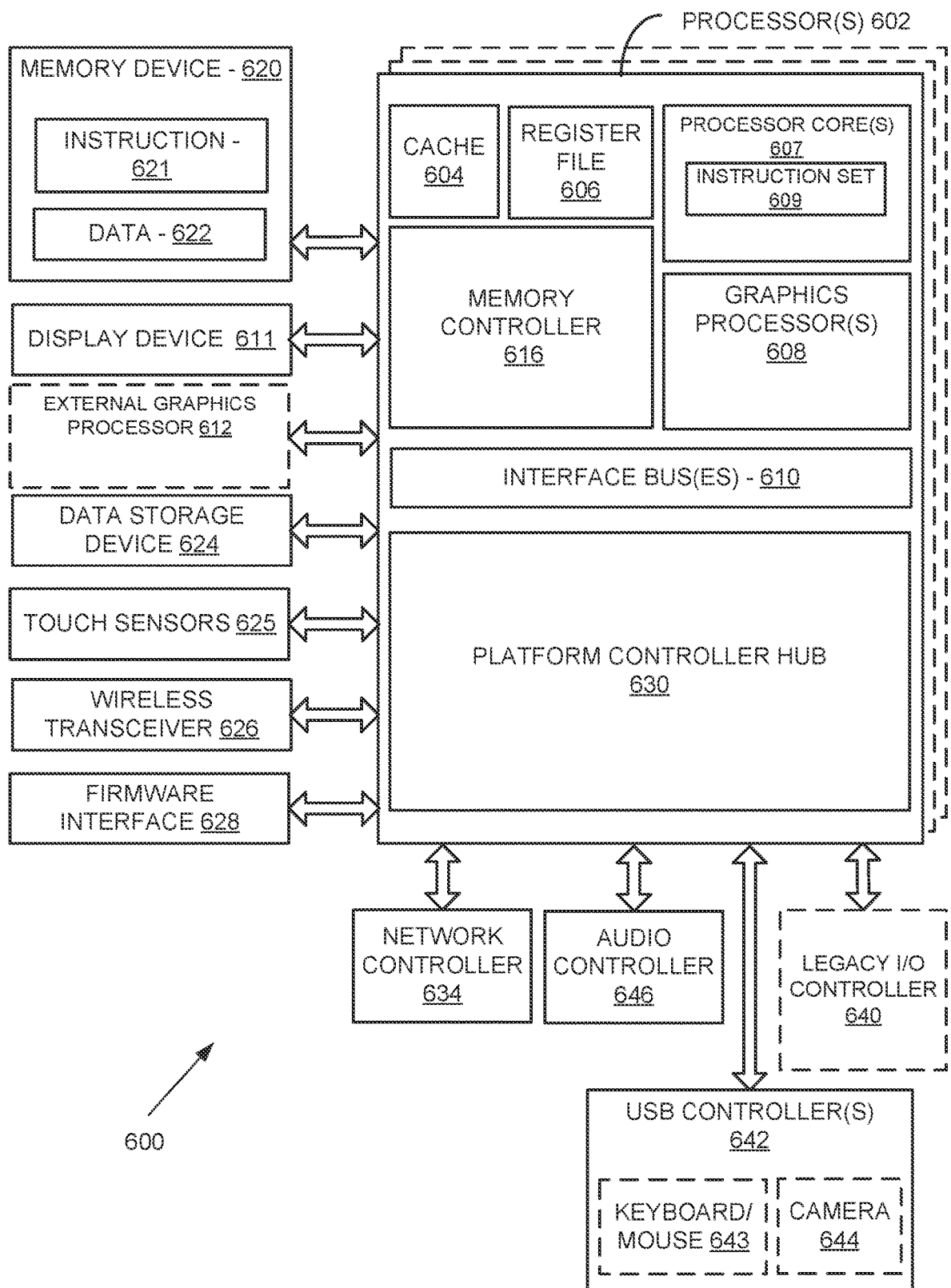
FIG. 6 illustrates at least portions of a graphics processor, according to one or more embodiments.

FIG. 6 is a block diagram of a processing system, according to at least one embodiment. In at least one embodiment, system 600 includes one or more processors 602 and one or more graphics processors 608, and may be a single processor desktop system, a multiprocessor workstation system, or a server system having a large number of processors 602 or processor cores 607. In at least one embodiment, system 600 is a processing platform incorporated within a system-on-a-chip (SoC) integrated circuit for use in mobile, handheld, or embedded devices.

In at least one embodiment, system 600 can include, or be incorporated within a server-based gaming platform, a game console, including a game and media console, a mobile gaming console, a handheld game console, or an online game console. In at least one embodiment, system 600 is a mobile phone, smart phone, tablet computing device or mobile Internet device. In at least one embodiment, processing system 600 can also include, couple with, or be integrated within a wearable device, such as a smart watch wearable device, smart eyewear device, augmented reality device, or virtual reality device. In at least one embodiment, processing system 600 is a television or set top box device having one or more processors 602 and a graphical interface generated by one or more graphics processors 608.

In at least one embodiment, one or more processors 602 each include one or more processor cores 607 to process instructions which, when executed, perform operations for system and user software. In at least one embodiment, each of one or more processor cores 607 is configured to process a specific instruction set 609. In at least one embodiment, instruction set 609 may facilitate Complex Instruction Set Computing (CISC), Reduced Instruction Set Computing (RISC), or computing via a Very Long Instruction Word (VLIW). In at least one embodiment, processor cores 607 may each process a different instruction set 609, which may include instructions to facilitate emulation of other instruction sets. In at least one embodiment, processor core 607 may also include other processing devices, such a Digital Signal Processor (DSP).

In at least one embodiment, processor 602 includes cache memory 604. In at least one embodiment, processor 602 can have a single internal cache or multiple levels of internal cache. In at least one embodiment, cache memory is shared among various components of processor 602. In at least one embodiment, processor 602 also uses an external cache (e.g., a Level-3 (L3) cache or Last Level Cache (LLC)) (not shown), which may be shared among processor cores 607 using known cache coherency techniques. In at least one embodiment, register file 606 is additionally included in processor 602 which may include different types of registers for storing different types of data (e.g., integer registers, floating point registers, status registers, and an instruction pointer register). In at least one embodiment, register file 606 may include general-purpose registers or other registers.

In at least one embodiment, one or more processor(s) 602 are coupled with one or more interface bus(es) 610 to transmit communication signals such as address, data, or control signals between processor 602 and other components in system 600. In at least one embodiment, interface bus 610, in one embodiment, can be a processor bus, such as a version of a Direct Media Interface (DMI) bus. In at least one embodiment, interface 610 is not limited to a DMI bus, and may include one or more Peripheral Component Interconnect buses (e.g., PCI, PCI Express), memory busses, or other types of interface busses. In at least one embodiment processor(s) 602 include an integrated memory controller 616 and a platform controller hub 630. In at least one embodiment, memory controller 616 facilitates communication between a memory device and other components of system 600, while platform controller hub (PCH) 630 provides connections to I/O devices via a local I/O bus.

In at least one embodiment, memory device 620 can be a dynamic random access memory (DRAM) device, a static random access memory (SRAM) device, flash memory device, phase-change memory device, or some other memory device having suitable performance to serve as process memory. In at least one embodiment memory device 620 can operate as system memory for system 600, to store data 622 and instructions 621 for use when one or more processors 602 executes an application or process. In at least one embodiment, memory controller 616 also couples with an optional external graphics processor 612, which may communicate with one or more graphics processors 608 in processors 602 to perform graphics and media operations. In at least one embodiment, a display device 611 can connect to processor(s) 602. In at least one embodiment display device 611 can include one or more of an internal display device, as in a mobile electronic device or a laptop device or an external display device attached via a display interface (e.g., DisplayPort, etc.). In at least one embodiment, display device 611 can include a head mounted display (HMD) such as a stereoscopic display device for use in virtual reality (VR) applications or augmented reality (AR) applications.

In at least one embodiment, platform controller hub 630 enables peripherals to connect to memory device 620 and processor 602 via a high-speed I/O bus. In at least one embodiment, I/O peripherals include, but are not limited to, an audio controller 646, a network controller 634, a firmware interface 628, a wireless transceiver 626, touch sensors 625, a data storage device 624 (e.g., hard disk drive, flash memory, etc.). In at least one embodiment, data storage device 624 can connect via a storage interface (e.g., SATA) or via a peripheral bus, such as a Peripheral Component Interconnect bus (e.g., PCI, PCI Express). In at least one embodiment, touch sensors 625 can include touch screen sensors, pressure sensors, or fingerprint sensors. In at least one embodiment, wireless transceiver 626 can be a Wi-Fi transceiver, a Bluetooth transceiver, or a mobile network transceiver such as a 3G, 4G, or Long Term Evolution (LTE) transceiver. In at least one embodiment, firmware interface 628 enables communication with system firmware, and can be, for example, a unified extensible firmware interface (UEFI). In at least one embodiment, network controller 634 can enable a network connection to a wired network. In at least one embodiment, a high-performance network controller (not shown) couples with interface bus 610. In at least one embodiment, audio controller 646 is a multi-channel high definition audio controller. In at least one embodiment, system 600 includes an optional legacy I/O controller 640 for coupling legacy (e.g., Personal System 2 (PS/2)) devices to system. In at least one embodiment, platform controller hub 630 can also connect to one or more Universal Serial Bus (USB) controllers 642 connect input devices, such as keyboard and mouse 643 combinations, a camera 644, or other USB input devices.

In at least one embodiment, an instance of memory controller 616 and platform controller hub 630 may be integrated into a discreet external graphics processor, such as external graphics processor 612. In at least one embodiment, platform controller hub 630 and/or memory controller 616 may be external to one or more processor(s) 602. For example, in at least one embodiment, system 600 can include an external memory controller 616 and platform controller hub 630, which may be configured as a memory controller hub and peripheral controller hub within a system chipset that is in communication with processor(s) 602.

Various embodiments can be described by the following clauses:

1. An apparatus for inducing a short in a high power direct current circuit, the apparatus comprising:
   a first switch bridge section configured to electrically connect to a circuit;
   a second switch bridge section configured to electrically connect to the circuit; and
   a switch arm to, when triggered by a trigger mechanism into a closed position after the circuit receives a live direct current, electrically connect the first conductive connector and the second conductive connector closing the circuit, wherein the switch is further to maintain the closed circuit after the short is induced until the switch disconnects the first conductive connector and the second conductive connector.

2 The apparatus of claim 1, further comprising: an insulated housing substantially enclosing at least the switch.

3. The apparatus of claim 1, wherein the switch is rotatably connected to the first conductive connector.

4. The apparatus of claim 1, further comprising: a switch release trigger configured to allow the switch to close the circuit.

5. The apparatus of claim 4, wherein the switch release trigger is a mechanically actuated trigger.

6. The apparatus of claim 4, wherein the switch release trigger is an electrically actuated trigger.

7. The apparatus of claim 1, further comprising:
   a low resistance, inductance, and capacitance electrical path.

8. A short circuit tester, comprising:
   a switch to be electrically connected to a circuit, the switch adapted to be moveable from an open position to a closed position, the switch to maintain the circuit in an open configuration when in the open position and to maintain the circuit in a closed configuration when in the closed position, the switch allowed to remain in the closed position indefinitely after a short occurs in the circuit.

9. The tester of claim 8, wherein the switch is moved to a closed position remotely.

10. The tester of claim 8, further comprising:
    a pair of conductive plates electrically connected to the circuit, the pair of conductive plates adapted to receive the switch in the closed position between the pair of conductive plates.

11 The tester of claim 10, further comprising:
    a clamping applicator configured to clamp the pair of conductive plates against the switch in the closed position.

12. The tester of claim 8, wherein the tester is portable.

13. The tester of claim 8, wherein the tester is configured to be reused to maintain the closed position after a short more than once.

14. The tester of claim 8, further comprising:
    a driving mechanism configured to position the switch in the closed position.

15. The tester of claim 8, further comprising:
the switch prevented from moving from the closed position to the open position until the circuit is deenergized.
16. A method for inducing a short in a high power direct current circuit, comprising:
receiving a first connection input from the circuit and a second connection input from the circuit to a testing fixture;
powering a direct current through the circuit;
positioning a switch to electrically connect the first input and the second input, the switch closing the circuit and inducing the short; and
maintaining the closed circuit after the short is induced until depowered.
17. The method of claim 16, further comprising:
measuring one or more characteristics of the circuit.
18. The method of claim 16, further comprising:
measuring one or more characteristics of the switch.
19. The method of claim 16, wherein impedance of the circuit is approximately constant while positioning the switch to electrically connect the first input and the second input.
20. The method of claim 16, wherein recoil of switch is minimized while positioning the switch to electrically connect the first input and the second input.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors.

In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors-for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. References may also be made to providing, outputting, transmitting, sending, or presenting analog or digital data. In at least one embodiment, processes of providing, outputting, transmitting, sending, or presenting analog or digital data can be accomplished by transferring data as an input or output parameter of a function call, a parameter of an application programming interface or inter-process communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An apparatus to test for a short, the apparatus comprising:
   a first switch bridge section to electrically connect to a circuit;
   a second switch bridge section to electrically connect to the circuit; and
   a switch to, when triggered into a closed position after the circuit receives a live direct current, close the circuit by electrically connecting the first switch bridge section and the second switch bridge section, wherein the switch maintains the closed circuit after the short is induced until the switch disconnects the first switch bridge section and the second switch bridge section.

2. The apparatus of claim 1, further comprising:
   an insulated housing substantially enclosing at least a part of the switch.

3. The apparatus of claim 1, wherein the switch further comprises a switch arm is rotatably connected to the first switch bridge section.

4. The apparatus of claim 1, further comprising:
a trigger mechanism to trigger the switch into a closed configuration.

5. The apparatus of claim 4, wherein the trigger mechanism is mechanically actuated.

6. The apparatus of claim 4, wherein the trigger mechanism is electrically actuated.

7. The apparatus of claim 1, further comprising:
wire connection blocks, having a low resistance, a low inductance, and a low capacitance, to electrically connect the first switch bridge section and the second switch bridge section with the circuit.

8. A short circuit tester, comprising:
a switch to be electrically connected to a circuit, the switch to change between an open position and a closed position, the switch to maintain the circuit in an open configuration when in the open position and to maintain the circuit in a closed configuration when in the closed position, the switch able to remain in the closed position indefinitely after a short occurs in the circuit.

9. The tester of claim 8, wherein the switch is remotely controlled to change to the closed configuration.

10. The tester of claim 8, further comprising:
a pair of conductive plates electrically connected to the circuit, the pair of conductive plates to receive the switch in the closed position between the pair of conductive plates.

11. The tester of claim 10, further comprising:
a bias applicator to clamp the pair of conductive plates against the switch in the closed position.

12. The tester of claim 8, wherein the tester is portable to be moved by carrying.

13. The tester of claim 8, wherein the tester is to be reused to maintain the closed position after the short more than once.

14. The tester of claim 8, further comprising:
a driving mechanism to change the switch to the closed position.

15. The tester of claim 8, further comprising:
the switch being prevented from changing from the closed position to the open position until the circuit is deenergized.

16. A method for inducing a short, comprising:
electrically connecting circuit to a testing fixture at a first wire connection block and a second wire connection block;
powering a direct current through the circuit;
positioning a switch to electrically connect the first wire connection block and the second wire connection block to close the circuit and induce the short; and
maintaining the closed circuit after the short is induced until depowered.

17. The method of claim 16, further comprising:
measuring data related to the circuit.

18. The method of claim 16, further comprising:
measuring data related to the switch.

19. The method of claim 16, wherein impedance of the circuit is approximately constant while positioning the switch to electrically connect the first wire connection block and the second wire connection block.

20. The method of claim 16, wherein recoil of a switch arm of the switch is minimized while positioning the switch to electrically connect the first wire connection block and the second wire connection block.

* * * * *